United States Patent [19]

Heibel et al.

[11] Patent Number: 5,331,813
[45] Date of Patent: Jul. 26, 1994

[54] BRAKE ACTUATOR ASSEMBLY FOR MOTOR VEHICLES

[75] Inventors: Helmut Heibel, Moschheim; Josef Pickenhahn, Plaidt, both of Fed. Rep. of Germany

[73] Assignee: Lucas Industries public limited company, Solihull, Great Britain

[21] Appl. No.: 984,588

[22] PCT Filed: Aug. 5, 1992

[86] PCT No.: PCT/EP92/01779

§ 371 Date: Mar. 11, 1993

§ 102(e) Date: Mar. 11, 1993

[87] PCT Pub. No.: WO93/02901

PCT Pub. Date: Feb. 18, 1993

[30] Foreign Application Priority Data

Aug. 5, 1991 [DE] Fed. Rep. of Germany ... 9109689[U]

[51] Int. Cl.$^5$ ............................................. B60T 13/00
[52] U.S. Cl. ............................... 60/547.1; 91/376 R; 92/98 R
[58] Field of Search ............ 60/547.1, 547.2, 581, 60/583, 585; 91/376 R, 369.1, 369.2; 92/98 R, 99

[56] References Cited

U.S. PATENT DOCUMENTS

| | | | |
|---|---|---|---|
| 4,022,112 | 5/1977 | Putt et al. | 91/376 R |
| 4,538,503 | 9/1985 | Hachiro | 91/376 R |
| 4,586,580 | 5/1986 | Spielmann et al. | 60/547.1 X |
| 4,592,438 | 6/1986 | Spielmann et al. | 60/547.1 X |
| 4,785,628 | 11/1988 | Myers | 60/547.1 |
| 4,787,205 | 11/1988 | Fontaine | 60/547.1 |
| 5,072,438 | 12/1991 | Heibel et al. | 60/547.1 X |

FOREIGN PATENT DOCUMENTS

| | | |
|---|---|---|
| 0052472 | 5/1982 | European Pat. Off. |
| 0215586 | 3/1987 | European Pat. Off. |
| 0331535 | 9/1989 | European Pat. Off. |
| 0340534 | 11/1989 | European Pat. Off. |
| 0348273 | 12/1989 | European Pat. Off. |
| WO90/11215 | 10/1990 | World Int. Prop. O. |

Primary Examiner—Edward K. Look
Assistant Examiner—Hoang Nguyen
Attorney, Agent, or Firm—Oblon, Spivak, McClelland, Maier & Neustadt

[57] ABSTRACT

A brake actuator assembly for motor vehicles. A mounting plate (14) formed with a central hole (60) serves for fastening a pneumatic brake pressure booster (22) to the splashboard (10) of a motor vehicle. The brake pressure booster (22) includes a rear housing portion (50) formed with a rearwardly projecting tubular connecting piece (52) which is pushed from the front through the central hole (60) in the mounting plate (14) and through a central recess (70) presented in a stiffening plate (66) which abuts against the mounting plate (60) from the rear. In this manner the brake pressure booster (22) is centered with respect to the mounting plate (14) and the stiffening plate (66). The stiffening plate (66) is formed in one piece with support blocks (68) for a pedal arrangement (20) of the usual kind in motor vehicles. The pedal unit (20) is entirely pre-assembled before the stiffening plate (66) is put together with the mounting plate (14) and the brake pressure booster (22), while being fastened to the splashboard at the same time.

7 Claims, 4 Drawing Sheets

BRAKE ACTUATOR ASSEMBLY FOR MOTOR VEHICLES

The invention relates to a brake actuator assembly for motor vehicles, comprising a pneumatic brake pressure booster which includes a rear housing portion with a tubular connecting piece projecting to the rear and is insertable into an opening formed in the splashboard of a motor vehicle, a mounting plate adapted to be fastened to the splashboard so as to close the opening, and a pedal arrangement including support blocks which are disposed near the tubular connecting piece.

As mechanized mounting (by robots) is practiced ever more in the final assembly of motor vehicles, demand has arisen for suppliers of subcomponents to provide those component parts combined with adjacent structural elements in subassemblies in a condition which permits their automatic final assembly in a way to dispense with subsequent adjustment operations.

In respect of brake components, this means that the brake manufacturer has to supply a previously assembled and adjusted aggregate for actuation of the brakes, with the vehicle manufacturer then merely looking after the mechanical attachment and hydraulical connection to the brakes.

EP 0 348 273 A1 discloses a brake actuator assembly of the kind specified initially with which the mounting plate is made in one piece with a front housing portion of the brake pressure booster, either by pressing or deep drawing, and two support blocks for the brake and clutch pedals are welded to the mounting plate at a respective side each of the brake pressure booster. This known design and arrangement of the components which make up the brake actuator assembly does not give the component group manufacturer the opportunity to put together the same mounting plate with different brake pressure boosters, as may be required, e.g. to replace a dual chamber brake pressure booster by one that comprises four chambers in tandem arrangement. The bearing or support blocks must be positioned precisely before being welded to the mounting plate. That requires expensive equipment which always must be exchanged when the shape of the support blocks or their mutual spacing changes.

It is, therefore, the object of the invention to devise a brake actuator assembly for motor vehicles of a kind which will be easily adaptable by proper choice of the various component parts and their simple assembling to meet different demands.

Starting from a brake actuator assembly of the kind specified initially, this object is met, in accordance with the invention, in that the mounting plate is a member which is independent of the brake pressure booster and has a central hole, the rear housing portion of the brake pressure booster has its tubular connecting piece passing through the central hole to the rear and fixed to the mounting plate, and the support blocks are formed in one piece with a common stiffening plate provided with a central recess through which the tubular connecting piece passes as well.

The tubular connecting piece which protrudes to the rear from the rear housing portion of the brake pressure booster, in a manner known per se, thus becomes a reference member for positioning the mounting plate and the pedal unit with respect to each other and to the brake pressure booster. Both the mounting plate and the stiffening plate may be centered directly or indirectly—the stiffening plate via the mounting plate or vice versa—on the tubular connecting piece. In any case, the pedal subassembly can be totally prefabricated before the stiffening plate is assembled with the mounting plate and the brake pressure booster. One and the same mounting plate can be fitted together selectively with brake pressure boosters of different diameters and/or different lengths as long as the rearwardly projecting tubular connecting pieces of these brake pressure boosters have the same diameter or provided any variations in diameter can be compensated by a simple annular adapter. In corresponding manner one and the same mounting plate can be assembled selectively with different pedal arrangements.

In a preferred embodiment of the invention the mounting plate is formed with a collar around its central hole, and the tubular connecting piece is centered at the inside of the collar, while the stiffening plate is centered at the outside of the collar.

Further advantageous modifications of the invention may be gathered from subclaims 3 to 6.

Embodiments of the invention will be described in greater detail below with reference to diagrammatic drawings, in which.

Figure 1:
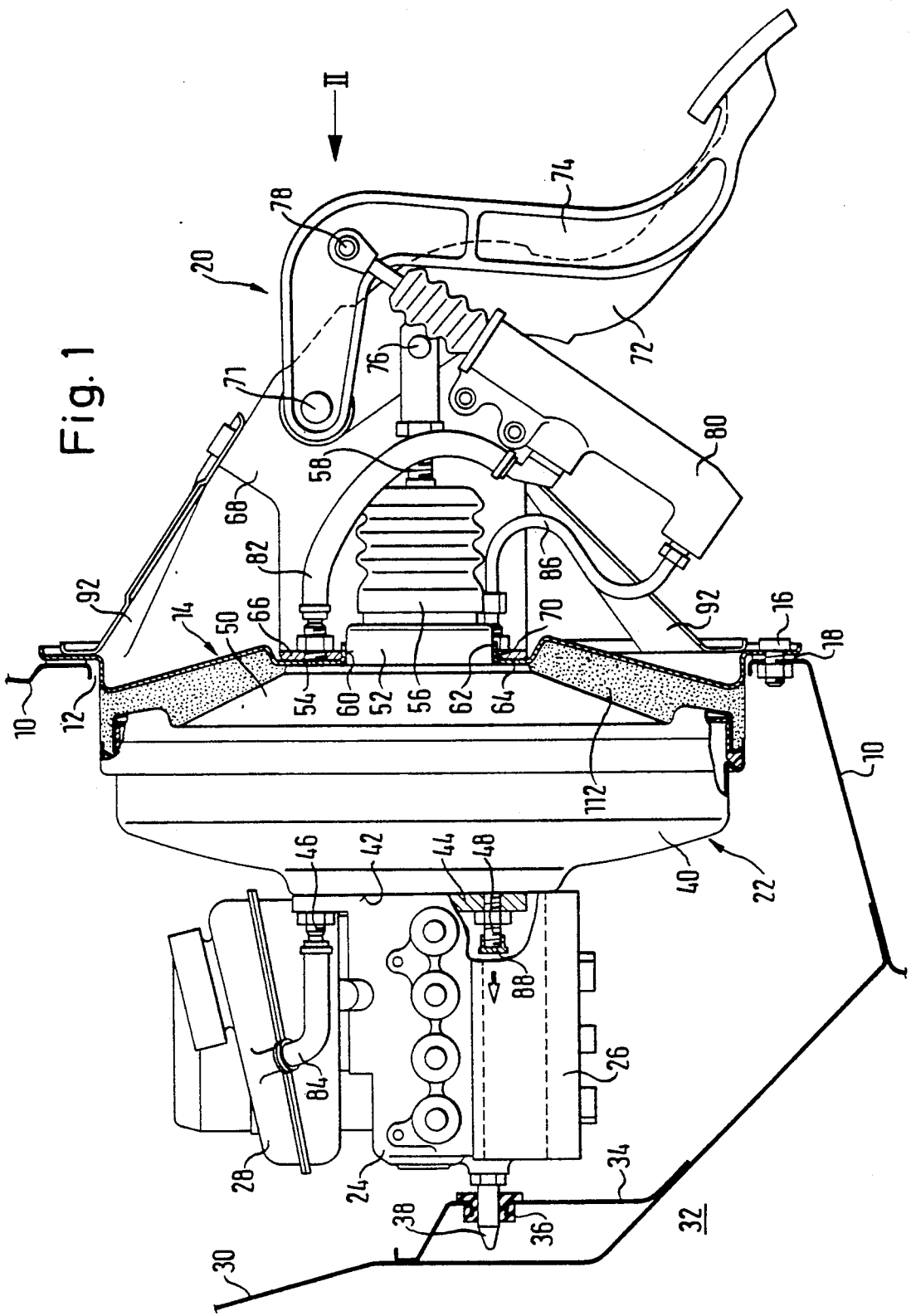
FIG. 1 is a side elevational view, partly in longitudinal section, of a brake actuator assembly installed in a motor vehicle.

FIG. 1 shows part of a splashboard 10 belonging to a motor vehicle and being formed with an opening 12. The opening 12 is closed by a mounting plate 14 secured to the splashboard 10 by screw bolts 16 with the intermission of sealing means 18. The mounting plate 14 and a pedal arrangement 20, a pneumatic brake pressure booster 22, a master cylinder 24, a control unit 26 for an anti-lock system (ABS), as well as a brake fluid reservoir 28 are combined in one assembly which is installed as a whole in the motor vehicle by placing the mounting plate 14 from behind against the edge of the splashboard 10 around the opening 12 thereof and attaching it to the splashboard by screws.

In the case of the embodiment illustrated in FIG. 1, the motor vehicle comprises not only the splashboard 10 but an additional partition 30 further to the front and welded to the splashboard 10, thereby limiting the engine room 32 of the motor vehicle to the rear so that the brake pressure booster 22, including the master cylinder 24, the ABS control unit 26, and the brake fluid reservoir 28 are safely housed in the space between the two walls 10 and 30. A retainer plate 34 with an inserted rubber sleeve 36 is welded to the backside of the partition 30. A retainer pin 38 is fastened to the master cylinder 24 so as to protrude to the front and is inserted by its pointed tip into the rubber sleeve 36 to give additional support to the brake actuator assembly.

The pneumatic brake pressure booster 22 includes a front housing portion 40 with a flat, annular abutment surface 42 to which a flange 44 of the master cylinder 24 is fastened by means of two tie bolts 46 and 48. The tie bolts 46 and 48 extend in backward direction through the front housing portion 40 as well as a rear housing portion 50, likewise pot-shaped, of the brake pressure booster 22. The brake pressure booster 22 includes a rearwardly projecting cylindrical, tubular connecting piece 52 which may be formed, for instance by deep drawing, in one piece with the rear housing portion 50. The tubular connecting piece 52 is surrounded at the rear housing portion 50 by a flat, annular abutment surface 54. The rear end of the tubular connecting piece 52 is connected by a bellows 56 to an actuating rod 58 guided for axial displacement in the brake pressure booster 22.

The mounting plate 14 has a central hole 60 surrounded by a rearwardly projecting, cylindrical collar 62. The collar 62 encloses the tubular connecting piece 52 practically without clearance or even under slight radial bias. A flat annular flange 64 is formed at the mounting plate 14 around the collar 62 to be engagaged at its front side by the abutment surface 54 of the rear housing portion 50. The front side of the flange 64 is engaged by a stiffening plate 66 which presents part of the pedal arrangement 20 and is formed integrally, e.g. by punching or pressing, with bearing or support blocks 68 projecting to the rear. The two tie bolts 46 and 48 extend through preformed, e.g. prepunched, apertures in the mounting plate 14 and in the stiffening plate 66 clamping them firmly together with the rear housing portion 50 of the brake pressure booster 22. The stiffening plate 66 has a central recess 70 engaged by the collar 62 in such a way that the stiffening plate 66 becomes centered on the mounting plate 14 and also with respect to the brake pressure booster through the mounting plate.

A bearing pin 71 extending horizontally and parallel to the mounting plate 14 is fixed to the support blocks 68 to support a brake pedal 72 and a clutch pedal 74. The brake pedal 72 is connected by a joint 76 to the actuating rod 58 of the brake pressure booster 22. The clutch pedal 74 is connected by another joint 78 to the piston rod of an hydraulic actuator 80 for a shift gear mechanism (not shown) of the motor vehicle.

Figure 2:
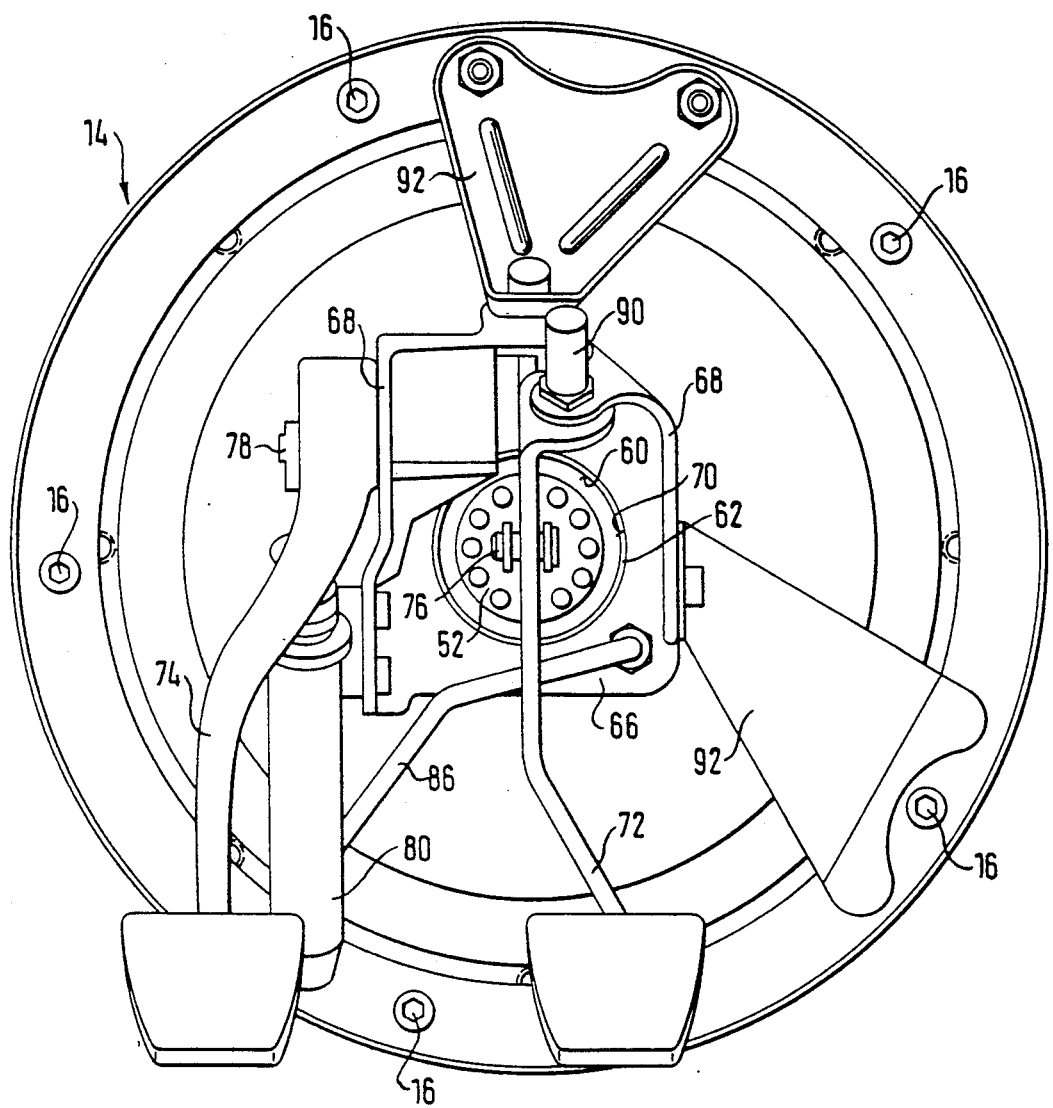
FIG. 2 shows the view from the rear in the direction of arrow II in FIG. 1.

In the embodiment shown in FIGS. 1 and 2 the tie bolts 46 and 48 are hollow. The hydraulic actuator 80 is connected by a hose 82 to the rear end of the upper tie bolt 46 whose front end communicates with the brake fluid reservoir 28 through a pipe section 84. In this manner the brake fluid reservoir also provides the hydraulic fluid for actuating the clutch. Another hose 86 links the actuator 80 with the rear end of the lower tie bolt 48 whose front end is closed by a plug 88, as shown in FIG. 1, up to the final assembly in the motor vehicle.

As may be taken from FIG. 2, the support blocks 68 can form part of a wall band bent continuously to the rear from the stiffening plate 66 at three or more sides. A brake light switch 90 is secured to said switch, as may be seen in FIG. 2, and various ABS functions may also be controlled by the same. If necessary, the support blocks 68 are supported additionally by webs 92 on the mounting plate 14. The properly aligned positioning of the preassembled, ready brake actuator assembly on the splashboard 10 is facilitated by two conical centering pins 94 disposed on the splashboard opposite each other with respect to the opening 12, as may be seen in FIGS. 3 and 4. These centering pins 94 each enter into a hole 96 at the edge of the mounting plate 14, whereby it is warranted that the screw bolts 16 can be threaded readily into their holes 98.

Figure 3:
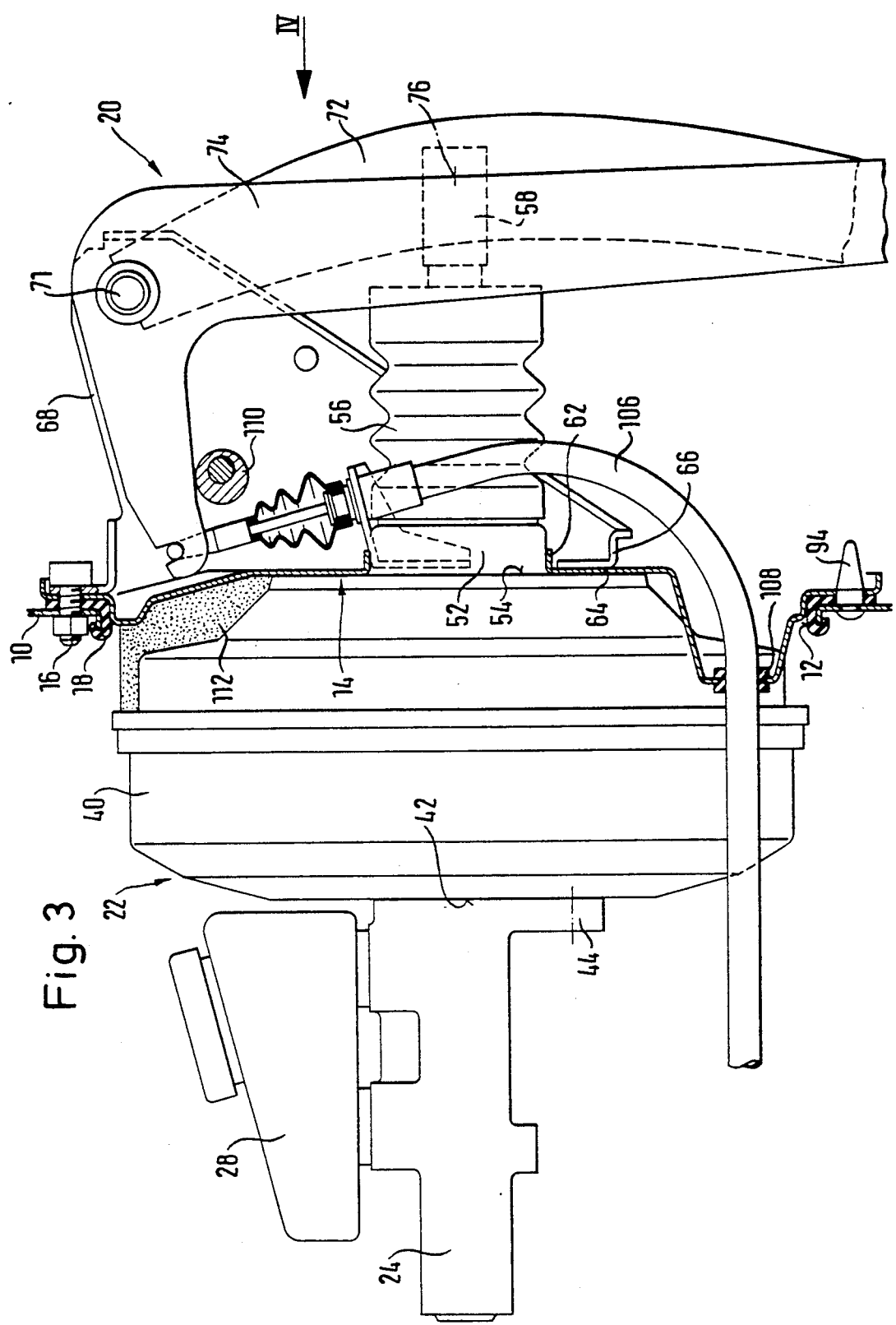
FIG. 3 is a side elevational view, partly in longitudinal section, of a modified brake actuator assembly likewise installed in a motor vehicle.
Figure 4:
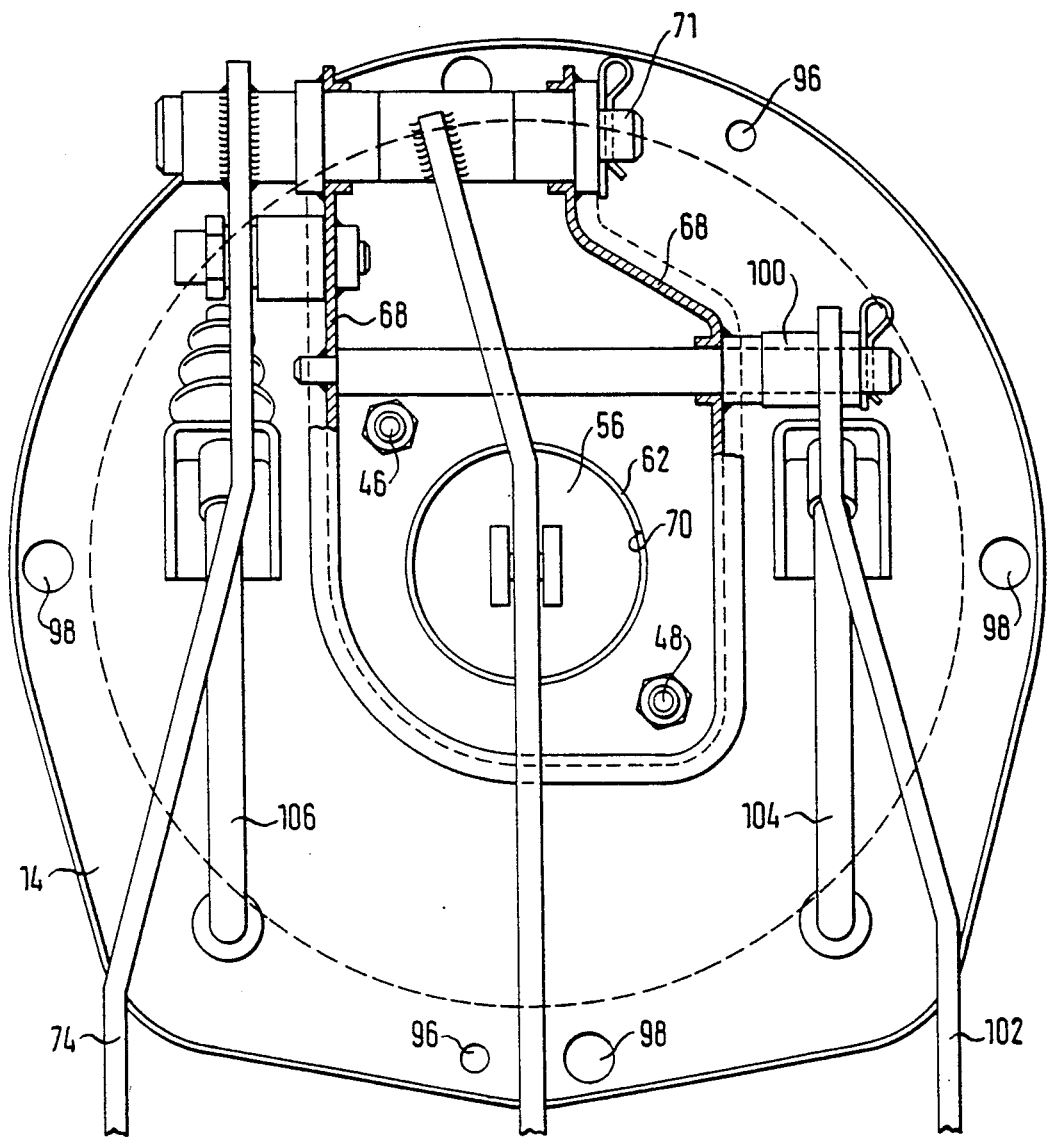
FIG. 4 shows the view from the rear in the direction of arrow IV in FIG. 3.

The embodiment according to FIGS. 3 and 4 differs from the one shown in FIGS. 1 and 2 above all in that the pedal arrangement 20 is partly of different design. It comprises an additional bearing pin 100 supporting an accelerator pedal 102 from which a Bowden cable 104 starts serving for control of a carburetor or an injection pump (not shown). In corresponding manner, a Bowden cable 106 starts from the clutch pedal 74; it is held in a rubber sleeve 108 which is inserted into the mounting plate 14. This may serve as an example to demonstrate that all the component parts belonging to the brake actuator assembly are connected directly or at least indirectly to the mounting plate 14 in such a way that the entire assembly can be handled easily and especially installed with ease in a motor vehicle.

Preferably the brake actuator assembly also comprises devices which permit all the necessary adjustments to be made prior to the installation of the assembly in a motor vehicle. One example shown in FIGS. 3 and 4 is an eccentric 110 by means of which a predetermined inoperative position of the clutch pedal 74 is fixed.

According to FIGS. 1 and 3, the brake pressure booster 22 as such is of conventional structure. That results in an intermediate space 112 between the mounting plate 14 and the rear housing portion 50 of the brake pressure booster 22. This space 112 is foam filled, preferably with polyurethane hard foam, or with some other kind of noise dampening material.

What is claimed is:

1. A brake actuator assembly for mounting in an opening (12) in a splash board (10) of a motor vehicle, comprising
   a pneumatic brake pressure booster (22) which includes a rear housing portion (50) having a tubular connecting piece (52) projecting rearwardly of said rear housing portion,
   a mounting plate (14) adapted to be fastened to said splashboard (10) so as to close said opening (12), and
   a pedal arrangement (20) including support blocks (68) adjacent said tubular connecting piece (52), characterized in that
   said mounting plate (14) is independent of said brake pressure booster (22) and has a central hole (60) therethrough,
   said rear housing portion (50) of said brake pressure booster (22) having said tubular connecting piece (52) passing rearwardly through said central hole (60) practically without clearance,
   said support blocks (68) being formed in one piece with a common stiffening plate (66) provided with a central recess (70) through which said tubular connecting piece (52) passes as well, and means for connecting said stiffening plate to said mounting plate.

2. The brake actuator assembly as claimed in claim 1, characterized in that said mounting plate (14) includes a rearwardly extending collar (62) around its central hole (60), said collar (62) having radially spaced inner and outer sides, said tubular connecting piece (52) being centered on the inner side of said collar (62) and said stiffening plate (66) being centered on the outer side of said collar (62).

3. The brake actuator assembly as claimed in claim 2, characterized in that an annular flange (64) is formed around the collar (62) of said mounting plate (14) and is clamped between an abutment surface (54) of said rear housing portion (50) and said stiffening plate (66).

4. The brake actuator assembly as claimed in claim 3, characterized in that said rear housing portion (50) and said mounting plate (14) diverge outwardly from said annular flange (64), to define an intermediate space (112) which is foam-filled.

5. The brake actuator assembly as claimed in any one of claims 1 to 4, characterized in that tie bolts (46, 48) extend through said stiffening plate (66), said mounting plate (14), and said brake pressure booster (22), and that a master cylinder (24) disposed in front of the brake pressure booster (22) is fixed to said tie bolts (46, 48).

6. The brake actuator assembly as claimed in claim 5, characterized in that
- a brake fluid reservoir (28) is connected to said master cylinder (24),
- and a clutch pedal (74) is carried by said support blocks (68) and connected to an hydraulic actuating device (80) for a clutch,
- said tie bolts (46, 48) being hollow and forming part of fluid conduit lines between said brake fluid reservoir (28) and said hydraulic actuating device (80) and between the latter and a clutch, respectively.

7. The brake actuating assembly as claimed in claim 1 wherein said means for connecting said stiffening plate to said mounting plate connects said stiffening plate directly to said mounting plate.

* * * * *